United States Patent
Fujita et al.

(10) Patent No.: US 11,347,203 B2
(45) Date of Patent: May 31, 2022

(54) LEARNING PROCESSOR, LEARNING PROCESSING METHOD, PRODUCTION METHOD OF COMPOUND SEMICONDUCTOR, AND RECORDING MEDIUM

(71) Applicant: Asahi Kasei Microdevices Corporation, Tokyo (JP)

(72) Inventors: Hiromi Fujita, Tokyo (JP); Yoshihiko Shibata, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 419 days.

(21) Appl. No.: 16/519,003

(22) Filed: Jul. 23, 2019

(65) Prior Publication Data

US 2020/0033838 A1   Jan. 30, 2020

(30) Foreign Application Priority Data

Jul. 24, 2018 (JP) .............................. JP2018-138592

(51) Int. Cl.
  *G05B 19/4155* (2006.01)
  *G06N 20/00* (2019.01)

(52) U.S. Cl.
  CPC ......... *G05B 19/4155* (2013.01); *G06N 20/00* (2019.01); *G05B 2219/45031* (2013.01)

(58) Field of Classification Search
  CPC ...... G05B 19/4155; G05B 2219/45031; G05B 13/0265; G06N 20/00
  See application file for complete search history.

(56) References Cited

U.S. PATENT DOCUMENTS

| | | | | |
|---|---|---|---|---|
| 5,345,391 A | * | 9/1994 | Hull | ........................ G06T 17/10 700/182 |
| 5,985,025 A | | 11/1999 | Celii | |
| 6,259,962 B1 | * | 7/2001 | Gothait | ................. B33Y 40/00 700/119 |
| 6,366,825 B1 | * | 4/2002 | Smalley | ................. B33Y 50/00 700/120 |
| 6,444,481 B1 | | 9/2002 | Pasadyn | |

(Continued)

FOREIGN PATENT DOCUMENTS

| | | |
|---|---|---|
| JP | H03171301 A | 7/1991 |
| JP | H0637021 A | 2/1994 |

(Continued)

*Primary Examiner* — Shogo Sasaki (57) ABSTRACT

Obtaining control conditions through trial and error is inefficient. Provided is a learning processor including a control condition acquiring section that acquires control condition data indicating a control condition of a film deposition apparatus; a film characteristic acquiring section that acquires film characteristic data indicating a characteristic of a film deposited by the film deposition apparatus that has been caused to operate according to the control condition indicated by the control condition data; and a learning processing section that performs learning processing of a model that outputs recommended control condition data indicating the control condition of the film deposition apparatus that is recommended in response to input of target film characteristic data indicating a target film characteristic, using learning data that includes the acquired control condition data and film characteristic data.

13 Claims, 9 Drawing Sheets

(56) References Cited

U.S. PATENT DOCUMENTS

| | | | | |
|---|---|---|---|---|
| 6,511,898 | B1* | 1/2003 | Sonderman | H01L 22/26 257/412 |
| 8,452,455 | B2* | 5/2013 | Mochizuki | G05B 19/41865 700/266 |
| 2002/0106819 | A1 | 8/2002 | Nozawa | |
| 2005/0103257 | A1 | 5/2005 | Xu | |
| 2007/0032896 | A1* | 2/2007 | Ye | G03F 7/705 700/108 |
| 2007/0118243 | A1* | 5/2007 | Schroeder | G16H 50/50 700/118 |
| 2007/0225851 | A1* | 9/2007 | Prager | G03F 7/70491 700/108 |
| 2009/0027681 | A1* | 1/2009 | De Vlaminck | G01N 21/554 356/445 |
| 2009/0250828 | A1* | 10/2009 | Rosen | B29D 11/00038 264/1.38 |
| 2013/0123988 | A1* | 5/2013 | Jariwala | B29C 64/135 700/266 |
| 2017/0278699 | A1 | 9/2017 | Kasai | |
| 2020/0038918 | A1* | 2/2020 | Deligianni | B08B 3/08 |

FOREIGN PATENT DOCUMENTS

| | | |
|---|---|---|
| JP | H0737821 A | 2/1995 |
| JP | H10237645 A | 9/1998 |
| JP | H10245674 A | 9/1998 |
| JP | 2007080963 A | 3/2007 |
| JP | 2013056803 A | 3/2013 |

* cited by examiner

LEARNING PROCESSOR, LEARNING PROCESSING METHOD, PRODUCTION METHOD OF COMPOUND SEMICONDUCTOR, AND RECORDING MEDIUM

The contents of the following Japanese patent application are incorporated herein by reference:

2018-138592 filed in JP on Jul. 24, 2018

BACKGROUND

1. Technical Field

The present invention relates to a learning processor, a learning processing method, a compound semiconductor production method, and a recording medium.

2. Related Art

Conventionally, in order to obtain a film with desired characteristics using a film deposition apparatus such as a molecular beam epitaxy apparatus, preferable control conditions are discovered by a skilled operator through trial and error, as shown in Patent Document 1, for example.

Patent Document 1: Japanese Patent Application Publication No. 2013-56803

However, obtaining control conditions through trial and error is inefficient.

SUMMARY

In order to solve the above problem, according to a first aspect of the present invention, provided is a learning processor. The learning processor may comprise a control condition acquiring section that acquires control condition data indicating a control condition of a film deposition apparatus. The learning processor may comprise a film characteristic acquiring section that acquires film characteristic data indicating a characteristic of a film deposited by the film deposition apparatus that has been caused to operate according to the control condition indicated by the control condition data. The learning processor may comprise a learning processing section that performs learning processing of a model that outputs recommended control condition data indicating the control condition of the film deposition apparatus that is recommended in response to input of target film characteristic data indicating a target film characteristic, using learning data that includes the acquired control condition data and film characteristic data.

According to a second aspect of the present invention, provided is a learning processing method. The learning processing method may comprise acquiring control condition data indicating a control condition of a film deposition apparatus. The learning processing method may comprise acquiring film characteristic data indicating a characteristic of a film deposited by the film deposition apparatus that has been caused to operate according to the control condition indicated by the control condition data. The learning processing method may comprise performing learning processing of a model that outputs recommended control condition data indicating the control condition of the film deposition apparatus that is recommended in response to input of target film characteristic data indicating a target film characteristic, using learning data that includes the acquired control condition data and film characteristic data.

According to a third aspect of the present invention, provided is a compound semiconductor production method. The compound semiconductor production method may comprise preparing a substrate. The compound semiconductor production method may comprise stacking a plurality of films to be included in a compound semiconductor on the substrate. The stacking may include causing the film deposition apparatus to operate using the learning processing method according to the second aspect, to deposit at least one of the plurality of films.

According to a fourth aspect of the present invention, provided is a storage medium storing thereon a program. The program may cause the computer to function as a control condition acquiring section that acquires control condition data indicating a control condition of a film deposition apparatus. The program may cause the computer to function as a film characteristic acquiring section that acquires film characteristic data indicating a characteristic of a film deposited by the film deposition apparatus that has been caused to operate according to the control condition indicated by the control condition data. The program may cause the computer to function as a learning processing section that performs learning processing of a model that outputs recommended control condition data indicating the control condition of the film deposition apparatus that is recommended in response to input of target film characteristic data indicating a target film characteristic, using learning data that includes the acquired control condition data and film characteristic data.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

(1. System)

Figure 1:
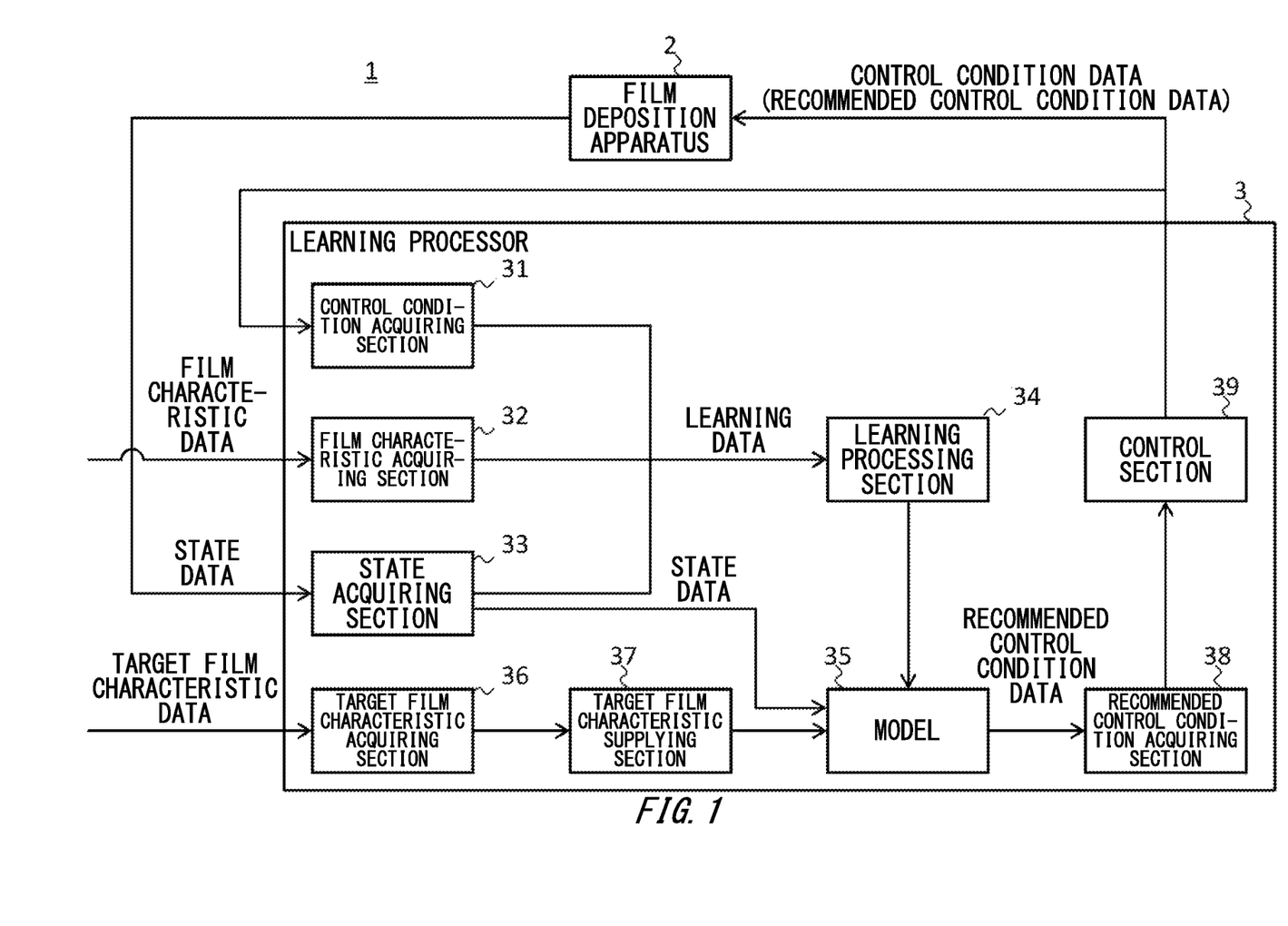
FIG. 1 shows a system 1 according to the present embodiment.

FIG. 1 shows a system 1 according to the present embodiment. The system 1 includes a film deposition apparatus 2 and a learning processor 3.

(1-1. Film Deposition Apparatus)

The film deposition apparatus 2 deposits a film on a surface of a substrate. The film deposition apparatus 2 may perform film deposition using vapor deposition, or another technique.

(1-2. Learning Processor)

The learning processor 3 performs learning processing using machine learning, and includes a control condition acquiring section 31, a film characteristic acquiring section 32, a state acquiring section 33, a learning processing section 34, and a model 35. As an example in the present embodiment, the learning processor 3 is able to control the film deposition apparatus 2 using the model 35, and also includes a target film characteristic acquiring section 36, a target film characteristic supplying section 37, a recommended control condition acquiring section 38, and a control section 39.

(1-2-1. Control Condition Acquiring Section)

The control condition acquiring section 31 acquires control condition data indicating control conditions of the film deposition apparatus 2. The control condition acquiring section 31 may acquire the control condition data from at least one of an operator, the film deposition apparatus 2, and the control section 39 that is described further below. The control condition acquiring section 31 may supply the acquired control condition data to the learning processing section 34.

(1-2-2. Film Characteristic Acquiring Section)

The film characteristic acquiring section 32 acquires the film characteristic data indicating the characteristics of the film deposited by the film deposition apparatus 2 that operates according to the control conditions indicated by the control condition data. The film characteristic acquiring section 32 may acquire the film characteristic data from at least one of the operator and a measurement apparatus (not shown in the drawings) for measuring the film characteristics. The measurement apparatus may be arranged within the film deposition apparatus 2 or outside of the film deposition apparatus 2. The film characteristic acquiring section 32 may supply the acquired film characteristic data to the learning processing section 34.

(1-2-3. State Acquiring Section)

The state acquiring section 33 acquires state data indicating the state of the film deposition apparatus 2. The state acquiring section 33 may acquire the state data from at least one of the operator and the film deposition apparatus 2. The state acquiring section 33 may acquire the temperature, humidity, and the like of the environment in which the film deposition apparatus 2 is installed, as the state data. The film characteristic acquiring section 32 may supply the acquired state data to the learning processing section 34 and the model 35.

(1-2-4. Learning Processing Section)

The learning processing section 34 performs learning processing of the model 35, using learning data input thereto. The learning data may include the control condition data from the control condition acquiring section 31, the film characteristic data from the film characteristic acquiring section 32, and the state data from the state acquiring section 33.

(1-2-5. Model)

The model 35 outputs recommended control condition data indicating control conditions recommended for the film deposition apparatus 2 in response to the input of target film characteristic data indicating target characteristics of the film. As an example in the present embodiment, the state data indicating the state of the film deposition apparatus 2 is further input to the model 35. The model 35 may be stored in a server outside the learning processor 3. The model 35 outputs the recommended control condition data to the recommended control condition acquiring section 38, but may also output the recommended control condition data to the outside of the learning processor 3.

(1-2-6. Target Film Characteristic Acquiring Section)

The target film characteristic acquiring section 36 acquires the target film characteristic data indicating the target characteristics of the film. As an example in the present embodiment, the target film characteristic acquiring section 36 acquires the target film characteristic data from the operator. The target film characteristic acquiring section 36 may supply the acquired target film characteristic data to the target film characteristic supplying section 37.

(1-2-7. Target Film Characteristic Supplying Section)

The target film characteristic supplying section 37 supplies the target film characteristic data from the target film characteristic acquiring section 36 to the model 35.

(1-2-8. Recommended Control Condition Acquiring Section)

The recommended control condition acquiring section 38 acquires the recommended control condition data output by the model 35 in response to the target film characteristic data being supplied to the model 35. The recommended control condition acquiring section 38 may supply the acquired recommended control condition data to the control section 39.

(1-2-9. Control Section)

The control section 39 causes the film deposition apparatus 2 to operate according to the control conditions indicated by the control condition data, by supplying this control condition data to the film deposition apparatus 2. For example, the control section 39 may cause the film deposition apparatus 2 to operate according to the control conditions indicated by the recommended control condition data, by supplying the recommended control condition data to the film deposition apparatus 2.

According to the system 1 described above, learning processing of the model 35 that outputs the recommended control condition data in response to the input of the target film characteristic data is performed, and therefore it is possible to acquire recommended control conditions by inputting target film characteristics. Accordingly, it is possible to obtain recommended control conditions without needing a skilled operator to obtain the control conditions through trial and error.

Furthermore, the model 35 outputs the recommended control condition data in response to the input of the target film characteristic data and the state data of the film deposition apparatus 2 and undergoes the learning processing using the learning data that includes the acquired state data, and therefore it is possible to obtain more accurate control conditions for creating a film having the target film characteristics.

Yet further, the target film characteristic data is supplied to the model 35 and the film deposition apparatus 2 is controlled according to the control conditions of the recommended control condition data, and therefore it is possible to obtain a film with the film characteristics identical or similar to the target film characteristics.

(2. Film Deposition Apparatus)

Figure 2:
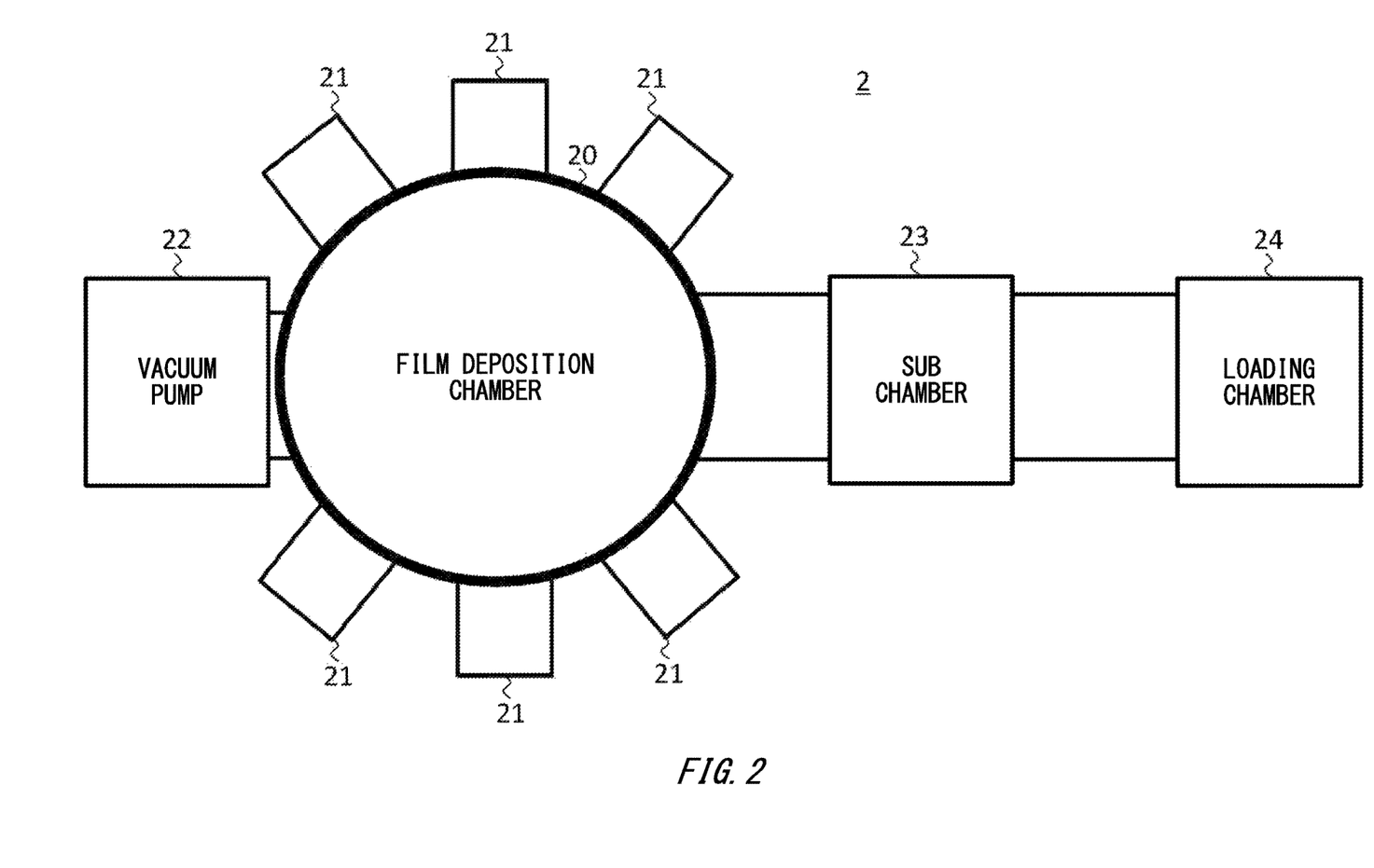
FIG. 2 is a planar view of the film deposition apparatus 2.

FIG. 2 is a planar view of the film deposition apparatus 2. As an example, the film deposition apparatus 2 is a molecular beam epitaxy apparatus, and deposits one or more films including at least one of Al, Ga, In, As, Sb, Si, Te, Sn, Zn, and Be onto a substrate 10 (see FIG. 3). As an example, the substrate may be a compound semiconductor made of gallium arsenide or the like, and the deposited film may be any of an n-type semiconductor layer, an undoped semiconductor layer, and a p-type active layer. Alternatively, the deposited film may be an unevenly doped layer (modulated doped layer) such as a δ doped layer, or may be a laminated body formed by these layers. The lattice constants of the substrate 10 and the film deposited on the substrate 10 may differ from each other, and the lattice constants of films that are adjacent above or below may each also differ. The film deposition apparatus 2 includes a film deposition chamber 20, one or more cells 21, a vacuum pump 22, a sub chamber 23, and a loading chamber 24.

The film deposition chamber 20 is a sealed reaction chamber for depositing the film onto the substrate 10 held therein. The film deposition chamber 20 includes one or more ports (not shown in the drawings) for connecting to the cells 21, in a peripheral portion thereof. The number of ports is 12, for example. The cells 21 are connected to the ports of the film deposition chamber 20, and vaporize the raw material that is a solid to supply the gas to the surface of the substrate 10 as a molecular beam. The raw material in the cells 21 may be at least one of Al, Ga, In, As, Sb, Si, Te, Sn, Zn, and Be, and may be a single one of these materials or a compound of these materials. The vacuum pump 22 is connected to the film deposition chamber 20, and discharges the air that is inside the film deposition chamber 20. The vacuum pump 22 may reduce the pressure within the film deposition chamber 20 to a vacuum state of approximately $10^{-11}$ Torr ($\approx 10^{-9}$ Pa). The sub chamber 23 is connected to the film deposition chamber 20, and temporarily holds the substrate 10 before being supplied to the film deposition chamber 20 for deposition or the substrate 10 discharged from the film deposition chamber 20 after the deposition. The inside of the sub chamber 23 may be maintained in a vacuum state similar to that of the film deposition chamber 20. Furthermore, the sub chamber 23 may include a heating mechanism to heat the substrate 10 introduced from the loading chamber 24, described further below, to desorb the adsorbed water and adsorbed gas on the surface of the substrate 10. The loading chamber 24 is connected to the sub chamber 23, and temporarily holds the substrate 10 supplied from outside the film deposition apparatus 2 or the substrate 10 discharged from the sub chamber 23.

(2-1. Film Deposition Chamber)

Figure 3:
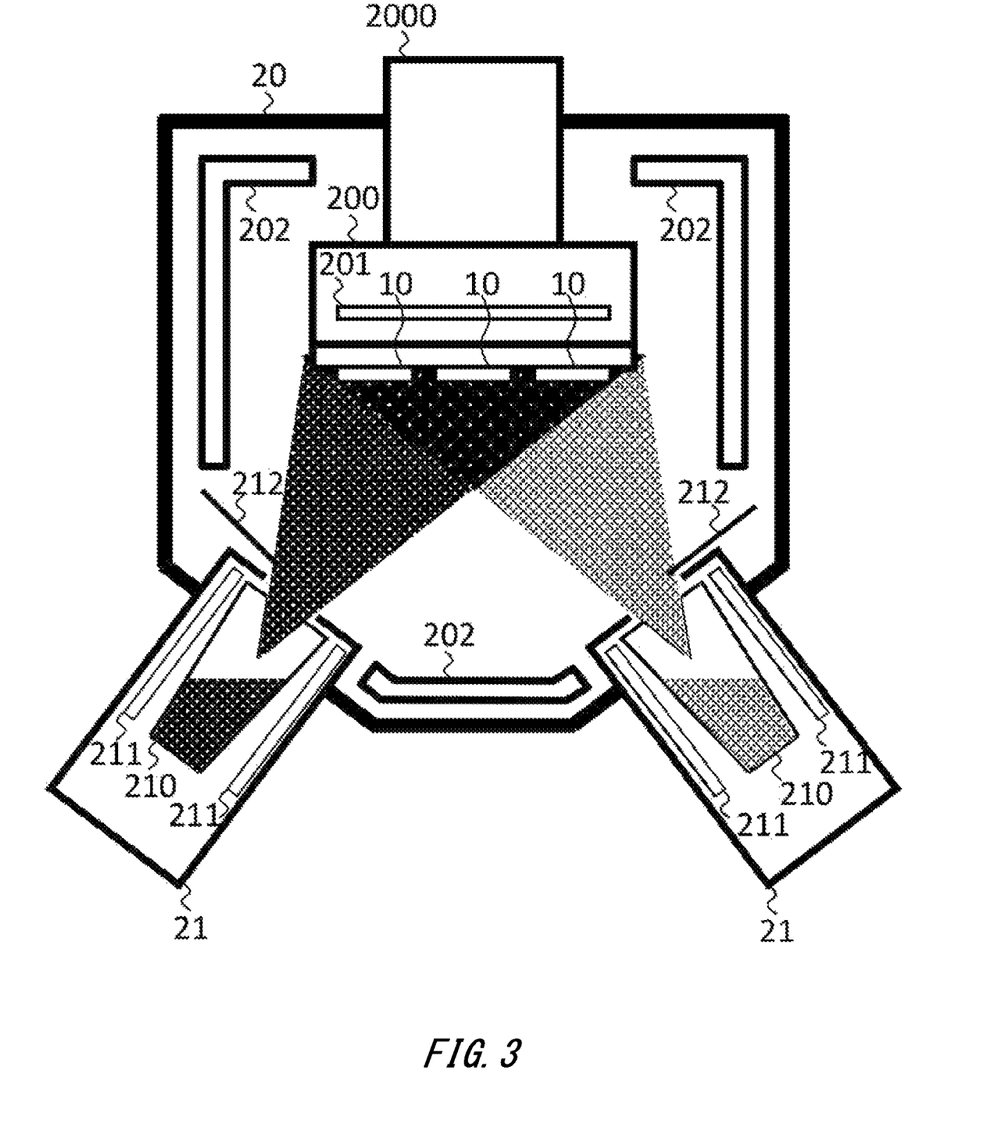
FIG. 3 is a vertical cross-sectional view of the film deposition chamber 20.

FIG. 3 is a vertical cross-sectional view of the film deposition chamber 20. The film deposition chamber 20 includes a substrate manipulator 200 that holds one or more substrates 10, a substrate heater 201 that heats the substrate 10 held by the substrate manipulator 200, a cryopanel 202 that sucks in the gas inside the film deposition chamber 20 by causing liquid nitrogen to flow therein, and the like. The substrate manipulator 200 may be provided to be rotatable centered on a shaft 2000. Furthermore, the film deposition chamber 20 may include a gas supply port for supplying gas (e.g. oxygen, ozone, nitrogen, or ammonia) or the like into the film deposition chamber 20. The film deposition chamber 20 may include a plasma generating mechanism to break down the gas and irradiate the substrate.

One or more cells 21 are provided in the peripheral portion of the film deposition chamber 20. As an example in the present embodiment, each cell 21 is a Knudsen cell, and includes a crucible 210 that holds the raw material, a heater 211 (also referred to as a cell heater 211) that heats the raw material inside the crucible 210, a shutter 212 that opens and closes an opening of the crucible 210 to adjust the flux amount (molecular dose or amount of vapor) of the raw material, and the like. The cell heater 211 in each cell 21 may be divided to be arranged at the top portion and bottom portion of the cell 21.

In the film deposition chamber 20 described above, the film deposition is performed by attaching the substrate 10 to the substrate manipulator 200, reducing the pressure in the film deposition chamber 20 with the vacuum pump 22, heating the substrate 10 with the substrate heater 201, and heating the cells 21 to irradiate the surface of the substrate 10 with the raw material as a molecular beam while rotating the substrate 10.

(2-2. Film Deposition Apparatus 2 Control Conditions)

The film deposition apparatus 2 performs the film deposition according to the control conditions. The control conditions are input conditions that are input to the apparatus, and are set by the operator, for example. The control conditions are not limited to conditions that can be controlled directly by the film deposition apparatus 2, and may be conditions that can be controlled indirectly. As an example, the control conditions may be at least one of the temperature of each cell 21, the power supplied to the cell heaters 211, the opening/closing condition of the shutter 212, the temperature of the substrate 10, the power supplied to the substrate heater 201, the degree of the vacuum of the film deposition chamber 20, the type of gas present in the film deposition chamber 20, the amount of this gas, the temperature of the cryopanel 202, the amount of liquid nitrogen supplied to the cryopanel 202, the time used for the film deposition, and the gain in the feedback control of the temperature of the cells 21 or the like. Among these, the opening/closing condition of the shutter 212 may be at least one of whether the shutter 212 is in the open state or the closed state, the timing of the opening/closing, and the speed of the opening/closing, for example. The gain in the feedback control may be at least one of the P gain, I gain, and D gain in PID control, for example. If the substrate manipulator 200 is capable of rotating, the rotational speed may be included in the control conditions. The amount of liquid nitrogen supplied to the cryopanel 202 may include the liquid surface (remaining amount) of the liquid nitrogen and the supply flow rate of the liquid nitrogen. The temperature of a thermocouple arranged between the substrate 10 and the substrate heater 201 to control the supply of power to the substrate heater 201, for example, can be used as the temperature of the substrate 10. The control conditions such as described above may be set to change over time, or may be set to be constant regardless of the passage of time. The control conditions may include reference numerals such as recipe numbers or numerals indicating the types of film structures such as laminated structure (1) and laminated structure (2), and setting values for each element included in the control conditions may be collected in association with such reference numerals. The vacuum degree of the film deposition chamber 20 is affected by the temperature of the cryopanel 202 (remaining amount of liquid nitrogen and the like), the operating state of the vacuum pump 22, the temperature of each cell 21, and the like, and therefore is state data indicating the state of the film deposition apparatus 2, but in a case where the film deposition operation is performed when the vacuum degree is better than a certain threshold value, it is possible to use this vacuum degree as a control condition. Similarly, at least some of the pieces of state data described further below indicating the state of the film deposition apparatus 2 may be used as control conditions.

Among the elements of the control conditions described above, the temperatures of the cells 21, the power supplied to the cell heaters 211, and the opening/closing condition of the shutter 212 may be used to indirectly control the flux amount of the raw material. When the flux amount changes, the amount of the raw material reaching the substrate 10 also changes, and therefore the composition and film characteristics (e.g. the film thickness, composition (Mixed crystal ratio and laminated structure), and the like) of the deposited film change. In this case, as a result of controlling the temperatures of the cells 21 as a control condition, for example, the flux amount of the raw material is a measured piece of state data. However, in a case where a correlation is set between the temperatures of the cells 21 and the flux amount of the raw material and it is possible to input the flux amount to the film deposition apparatus 2 to control the flux amount, due to the configuration of the film deposition apparatus 2, the flux amount of the raw material can become a control condition. The temperature of a cell 21 can be the temperature of the thermocouple installed near the crucible attached to the cell 21, in order to control the supply of power to the cell heater 211, for example.

Furthermore, the power supplied to the substrate heater 201 may indirectly control the substrate temperature. When the substrate temperature changes, the ease with which the raw material that has reached the substrate 10 moves also changes, and therefore the degree of crystallization, surface shape, and film characteristics (e.g. flatness, crystallinity, and the like) within the deposited film change.

Yet further, the vacuum degree of the film deposition chamber 20, the type of gas present inside the film deposition chamber 20, the amount of this gas, the temperature of the cryopanel 202, and the flow rate of the liquid nitrogen in the cryopanel 202 may directly or indirectly control the vacuum degree and the quality of the vacuum within the film deposition chamber 20. When the vacuum degree and the vacuum quality change, the amount of impurities mixed into the deposited film also changes, and therefore the characteristics of the deposited film change.

(2-3. Maintenance)

Various types of maintenance are performed on the film deposition apparatus 2. For example, maintenance may be performed on the film deposition chamber 20, the sub chamber 23, and the loading chamber 24 after opening these chambers to the outside atmosphere, or may be performed while keeping these chambers closed. The maintenance can be performed in a state where the nitrogen has been vented or purged. The maintenance may be performed periodically (e.g. once a year), performed according to the film characteristics of the deposited film, or performed according to the lifetime of the used components, damage to the used components, or the like.

(3. Operation)

(3-1. Model Learning Processing)

Figure 4:
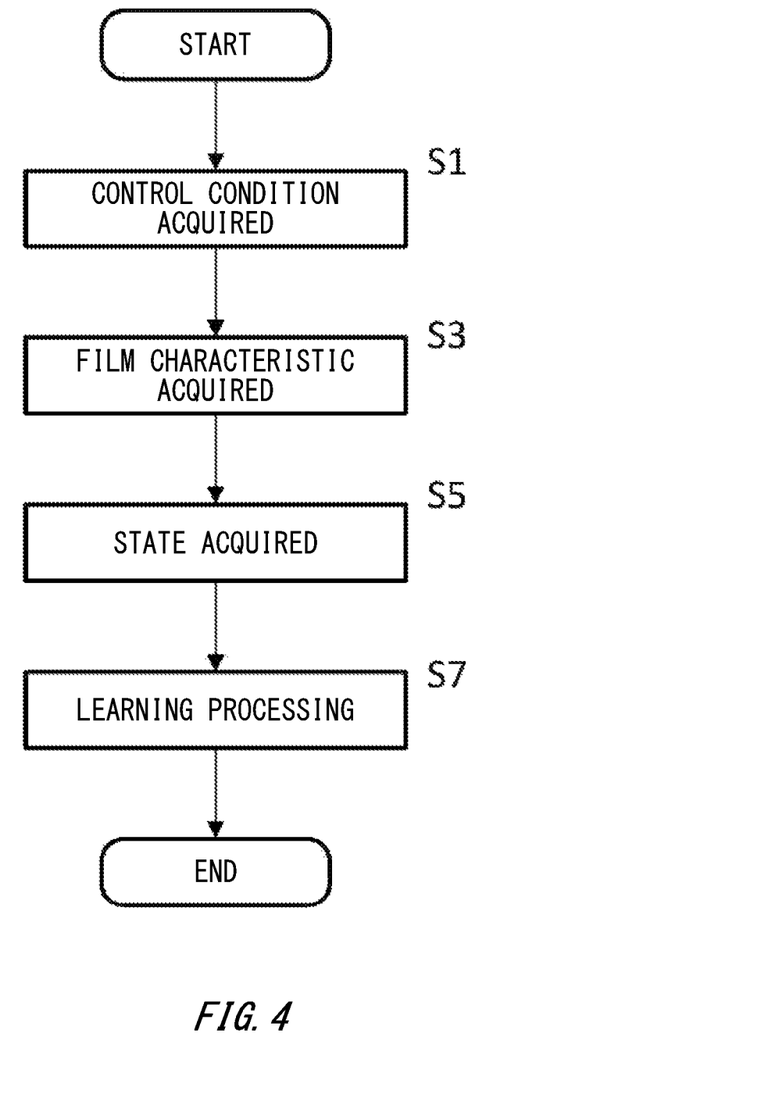
FIG. 4 shows the model 35 learning method.

FIG. 4 shows the model 35 learning method. The system 1 learns the model 35 by performing the processes of steps S1 to S7. The system 1 may perform the processes of steps S1 to S7 each time the film deposition operation is performed by the film deposition apparatus 2, or may perform these processes for part of the film deposition operation, such as only a portion of the film deposition operation in a certain time period. The structure of the deposited film may be a single-layer film or a laminated film.

At step S1, the control condition acquiring section 31 acquires the control condition data that indicates the control conditions of the film deposition apparatus 2.

At step S3, the film characteristic acquiring section 32 acquires the film characteristic data of the film deposited by the film deposition apparatus 2 that was caused to operate according to the control conditions indicated by the control condition data. The film characteristic data may include data concerning at least one of the film thickness, composition, flatness, electrical characteristics (e.g. mobility, carrier concentration, resistance value, and the like), optical characteristics (e.g. bandgap, transmittance, transmission spectrum, photoluminescence intensity, photoluminescence wavelength peak, and the like), crystallinity, surface information, and dislocation density. The film characteristics may be characteristics of a single-layer film or of a plurality of laminated films. Each characteristic may be any of a maximum value, minimum value, average value, or value distribution among a plurality of positions of the film, or may be a value at a single position (e.g. the center) of the film. The composition may be the compositional ratio of a configurational element, or may be a lattice constant. The surface information may include information obtained from an optical micrograph of the deposited film, and may include information obtained from the measurement of unevenness of the surface, such as by a step gauge, AFM, or foreign substance inspection device. In a case where film deposition is performed for a plurality of substrates 10 in a single film deposition operation by the film deposition apparatus 2 (also referred to as a plurality of substrates 10 in the same batch), i.e. in a case where a plurality of substrates 10 are held by the substrate manipulator 200, the film characteristic acquiring section 32 may acquire the film characteristics of all of the substrates 10 among the plurality of substrates 10 in the same batch by inspecting all of the substrates 10, or may acquire these film characteristics by performing an inspection that leaves out the film characteristics of some of the substrates 10. As an example, the film characteristic acquiring section 32 may acquire electrical characteristics, surface states, and the like of the films by inspecting all of the substrates 10, and may acquire the film thicknesses, crystallinities, and the like by performing an inspection that leaves out some of the substrates 10.

At step S5, the state acquiring section 33 acquires the state data indicating the state of the film deposition apparatus 2. The state data may include an actual value of a control target (e.g. actual values in time sequence measured at a plurality of time points or an actual value measured at a certain time point) obtained when the film deposition apparatus 2 operates according to the control conditions indicated by the control condition data. For example, the state data may include data concerning at least one of the flux amount of the raw material irradiating the substrate 10, the temperature of each cell 21, the temperature of the cell heater 211, the power supplied to the cell heater 211, the opening/closing timing of the shutter 212, the opening/closing speed of the shutter 212, the temperature of the substrate 10, the temperature of the substrate heater 201, the power supplied to the substrate heater 201, the vacuum degree of the film deposition chamber 20, the type of gas present inside the film deposition chamber 20, the amount of this gas, the temperature of the cryopanel 202, the flow rate of the liquid nitrogen in the cryopanel 202, the gain in the feedback control of the temperatures of the cells 21, and the rotational velocity of the substrate manipulator 200. Among these, the temperature of each cell 21, the temperature of the cell heater 211, and the temperature of the substrate heater 201 may be measured by a thermocouple. The temperature of the substrate 10 may be measured by a radiation thermometer arranged inside or outside the film deposition chamber 20. Alternatively, the temperature of the substrate 10 may be measured or calculated based on the band-end absorption or transparent spectrum of the substrate 10. The vacuum degree of the film deposition chamber 20 may be measured by an ion gauge arranged inside the film deposition chamber 20. The type and amount of gas present in the film deposition chamber 20 may be measured by a quadrupole mass spectrometer arranged inside the film deposition chamber 20. The state data may include the total film deposition time after maintenance is performed on the film deposition apparatus 2 (elapsed time since the start of the so-called campaign), data concerning a RHEED image, and characteristics of a base surface (e.g. characteristics of the substrate 10). The state acquiring section 33 may acquire the state data concerning the flux amount of the raw material for each cell 21, or may acquire this state data for some of the cells 21. The state acquiring section 33 may acquire the state data concerning the substrate temperature for each substrate 10, or may obtain this state data for some of the substrates 10. The state acquiring section 33 may acquire the state data concerning the vacuum degree and vacuum quality inside the film deposition chamber 20 as time series data.

Furthermore, the state data may include operating history data indicating the operating history of the film deposition apparatus 2. The operating history data may include at least one of data concerning at least the number of times maintenance has been performed on the film deposition apparatus 2 and the content of the maintenance (e.g. replacement of a certain component, cleaning, and the like), data concerning the number of times at least one component of the film deposition apparatus 2 has been used, data concerning the amount of raw material charged in the crucible of each cell 21 during maintenance and the number of times the film deposition apparatus 2 has performed film deposition, and data concerning films deposited in the past. The data concerning at least one of the number of times maintenance has been performed and the content of the maintenance may be data indicating the maintenance history. The data concerning the number of times film deposition has been performed may be the number of times film deposition was performed after maintenance, or may be the number of times film deposition was performed totaled independently from the maintenance. The data concerning films formed in the past may be history data indicating the type, characteristics, and the like of films deposited in the past. The pieces of operating history data can be obtained in relation to the raw material attachment state inside the film deposition chamber 20 and the state of the thermal capacitance and thermal conduction of each member.

The processes of step S1, S3, and S5 do not need to be performed in this order. Furthermore, in a case where the learning processing of FIG. 4 is performed a plurality of times, the process of one of step S3 and step S5 may be omitted from some instances of the learning processing, and both step S3 and step S5 may be omitted from other instances of the learning processing. Furthermore, in the process of step S5, the flux amount of the raw material that is radiated due to the cell temperature (control condition) increase without using the substrate 10 may be acquired as the state data. In this case, the film deposition apparatus 2 is caused to operate according to the control conditions indicated by the control condition data in the process of step S3, and the film characteristics may be set to be blank data.

At step S7, the learning processing section 34 performs the learning processing of the model 35 using the learning data including the acquired control condition data, film characteristic data, and state data. If the process of step S3 is not performed, the learning processing section 34 may perform the learning processing of the model 35 using the learning data that does not include the film characteristic data. If the process of step S5 is not performed, the learning processing section 34 may perform the learning processing of the model 35 using the learning data that does not include the state data, or may perform the learning processing using the state data acquired for a previous film deposition operation. As an example in the present embodiment, the model 35 is a neural network such as a recurrent or time-delay neural network, but may instead be another machine learning algorithm including random forest, gradient boosting, logistic regression, and a support vector machine (SVM). For example, the model 35 may include nodes corresponding to each element of the learning data in an input layer, and include nodes corresponding to each element of the control conditions to be recommended in an output layer. There may be one node or a plurality of nodes in the input later for each element of the learning data. An intermediate layer (hidden layer) including one or more nodes may be interposed between the input layer and the output layer. The learning processing section 34 may perform the learning processing by adjusting the weights of the edges connecting the nodes and the bias values of the output nodes.

According to the operation described above, it is possible to generate the model 35 that outputs recommended control conditions in response to the input of target film characteristics. Furthermore, since the state data includes operating history data, it is possible to obtain more accurate control conditions for creating the film with the target film characteristics. Since the operating history data includes data concerning at least one of the number of times maintenance has been performed and the content of the maintenance, it is possible for the model 35 to learn the relationship between the film characteristics and the number of times maintenance has been performed and content of the maintenance. In the interest of achieving such an effect, the film characteristic data is preferably obtained from films that have been deposited by the film deposition apparatus 2 for which maintenance has been performed at least twice.

(3-2. Compound Semiconductor Production)

Figure 5:
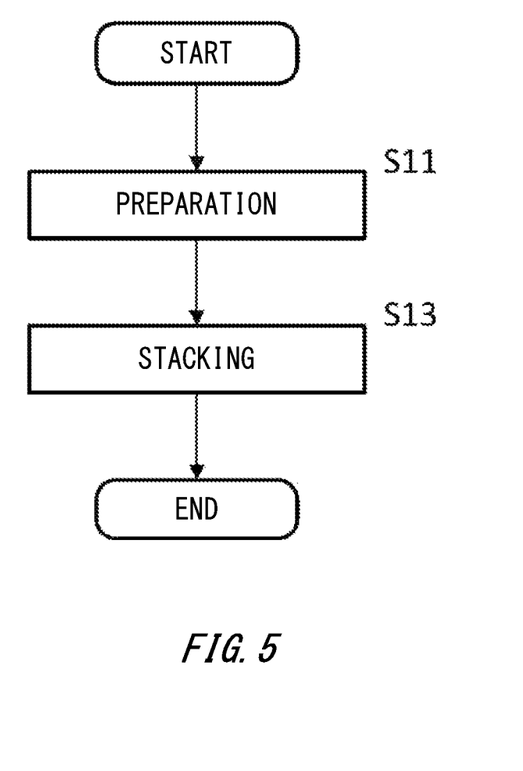
FIG. 5 shows a compound semiconductor production method.

FIG. 5 shows a compound semiconductor production method. First, at step S11, the operator prepares a substrate 10. For example, the operator sets the substrate 10 inside the film deposition chamber 20 of the film deposition apparatus 2. At step S13, the operator stacks a plurality of films to be included in the compound semiconductor onto the substrate 10. In this way, the compound semiconductor in which a plurality of films are stacked on the substrate 10 is produced.

(3-2-1. Film Deposition Using the Model)

Figure 6:
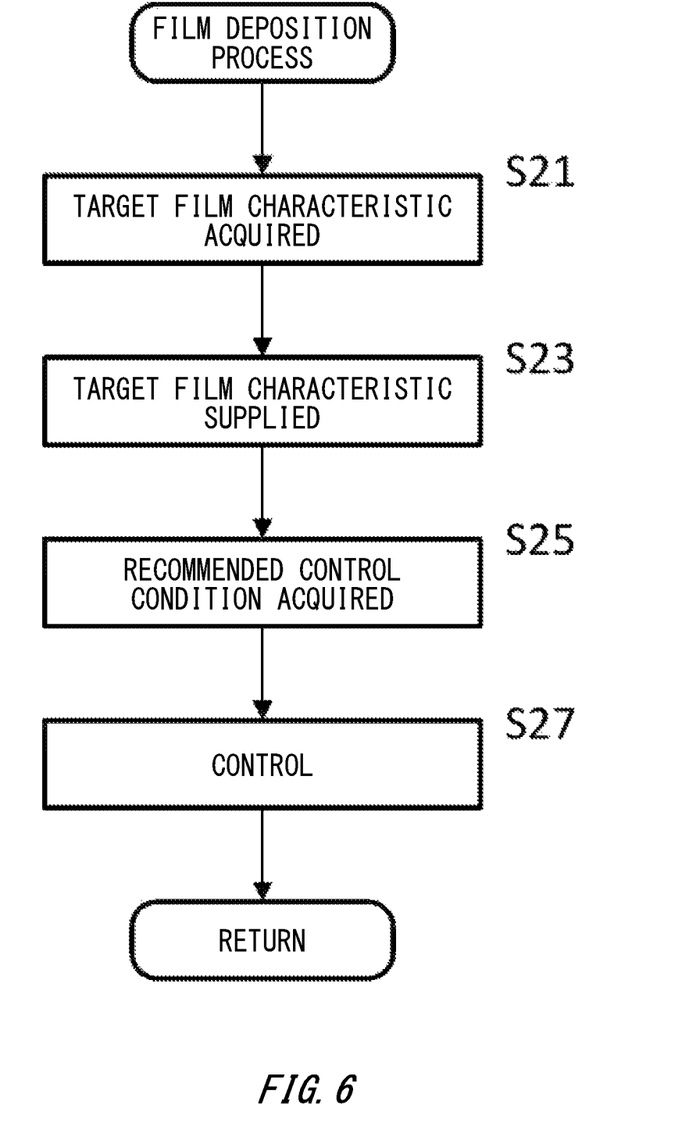
FIG. 6 shows a film deposition method using the model 35.

FIG. 6 shows a film deposition method using the model 35. The system 1 may deposit at least one film among the plurality of stacked films in the process of step S13 described above, using the processes of step S21 to step S27.

At step S21, the target film characteristic acquiring section 36 acquires the target film characteristic data indicating the target film characteristics, for a film that is the deposition target of the target film characteristic acquiring section 36, and at step S23, the target film characteristic supplying section 37 supplies the target film characteristic data to the model 35. As a result, the recommended control condition data concerning the control conditions of the film deposition apparatus 2 is output from the model 35. The target film characteristic data may include, in addition to physical characteristics such as flatness and electrical characteristics, for example, recipe numbers or numerals indicating the types of film structures such as laminated structure (1) and laminated structure (2), and such identification information may be input with the target film characteristic data.

At step S25, the recommended control condition acquiring section 38 acquires the recommended control condition data output from the model 35, and at step S27, the control section 39 causes the film deposition apparatus 2 to operate according to the recommended control condition data. In this way, the film having characteristics identical to or similar to the target film characteristics is deposited. If the film deposition is performed as described above, the learning processing of the model 35 may further be performed, by inputting the control condition data, state data, and film characteristic data during film deposition into the model 35 as learning data, and performing the learning processing of FIG. 4 described above. In this case, it is possible for the learning processing of the model 35 to progress while producing compound semiconductors.

(3-3. Operation Example)

First, if maintenance has been performed on the film deposition apparatus 2, the temperature of each cell 21 and the temperature of the substrate 10 are raised and lowered to acquire the state data such as the flux amount of the raw material and the substrate temperature, and this state data and the target film characteristic data are input to the model 35 to perform film deposition with the film deposition apparatus 2 according to the recommended control condition data obtained from this input. In this way, if the correlation between the control conditions and the film characteristics differs because of differences in the state of the film deposition apparatus 2 (e.g. the amount of raw material charged in the cells 21, the dirtiness of the inner wall surface of the film deposition chamber 20, the position of the thermocouple used for the temperature measurement, and the like) for every instance of maintenance, the correlation for the campaign after the most recent instance of maintenance is accurately predicted and the film deposition is performed according to the recommended control condition data.

Then, when performing film deposition in the future, film deposition is performed by the film deposition apparatus 2 according to the recommended control condition data obtained in response to the input of the current target film characteristic data and state data of the film deposition apparatus 2. In this way, if the correlation between the control condition concerning the flux amount of the raw material and the actual flux amount, and therefore the correlation between the control conditions and the film characteristics, differs from the correlation during the previous film deposition due to the raw material in a cell 21 being consumed, for example, this correlation is accurately predicted and the film deposition is performed according to the recommended control condition data. Furthermore, if the correlation between the control condition concerning the substrate temperature and the actual substrate temperature, and therefore the correlation between the control conditions and the film characteristics, differs from the correlation during the previous film deposition due to the raw material sticking to the inside of the film deposition chamber 20, this correlation is accurately predicted and the film deposition is performed according to the recommended control condition data. The learning processing of the model 35 may be performed every time film deposition is performed, using the control condition data, state data, and film characteristic data as the learning data.

(4. Specific Example of Compound Semiconductor)

The compound semiconductor to be produced may be used in a sensor such as a magnetic sensor or an infrared sensor (e.g. an infrared gas sensor), for example. The compound semiconductor may be used for another purpose, such as a light emitting element of an LED.

Figure 7:
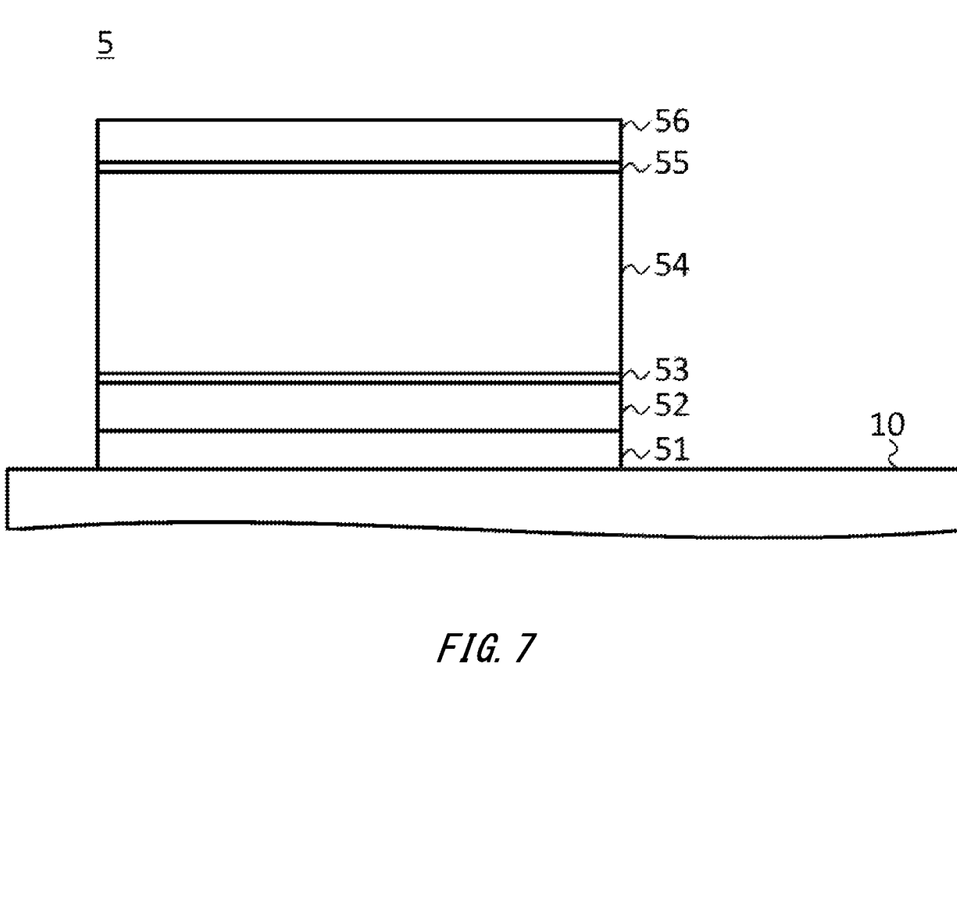
FIG. 7 shows a layered configuration of an infrared sensor 5.

FIG. 7 shows a layered configuration of an infrared sensor 5. As an example, the infrared sensor 5 includes, on a gallium arsenide substrate 10, an $n^-$ layer 51 of indium antimonide (InSb), an $n^+$ layer 52 of aluminum indium antimonide (AlInSb), an $n^+$ layer (barrier layer) 53 of aluminum indium antimonide (AlInSb), an active layer 54 of aluminum indium antimonide (AlInSb), a $p^+$ layer (barrier layer) 55 of aluminum indium antimonide (AlInSb), and a $p^+$ layer 56 of indium antimonide (InSb). The film deposited according to the film deposition method of FIG. 6 may be any of the layers 51 to 56. The infrared sensor 5 may further include a silicon dioxide ($SiO_2$) layer, a silicon nitride ($Si_3N_4$) layer, and/or an electrode layer.

In the embodiment described above, the learning processor 3 is described as including the state acquiring section 33, the target film characteristic acquiring section 36, the target film characteristic supplying section 37, the recommended control condition acquiring section 38, and the control section 39, but at least one of these components may be omitted. If the state acquiring section 33 is not included, the learning processor 3 may perform the learning processing of the model 35 using the control condition data and the film characteristic data as the learning data. Furthermore, the target film characteristic acquiring section 36, the target film characteristic supplying section 37, the recommended control condition acquiring section 38, and the control section 39 may be implemented in an external apparatus of the learning processor 3 (e.g. the control apparatus of the film deposition apparatus 2).

Figure 8:
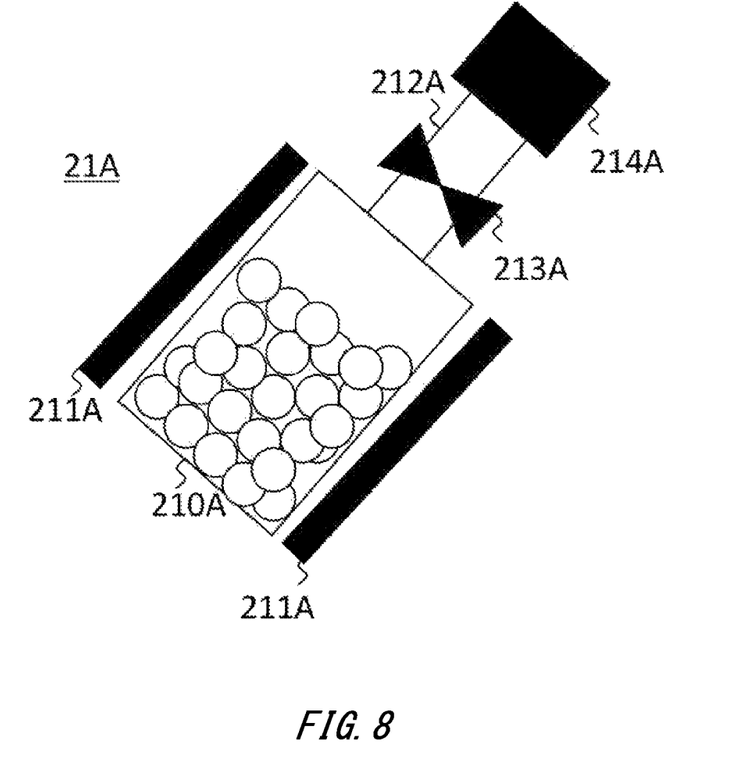
FIG. 8 is a conceptual view of a valved cracker cell 21A.

Furthermore, the cells 21 are described as Knudsen cells, but in a case where a group 5 element (e.g. antimony (Sb)) is used as the raw material, for example, the cells 21 may be valved cracker cells. FIG. 8 is a conceptual view of a valved cracker cell 21A. The valved cracker cell 21A includes a container 210A that holds the raw material, a cell heater 211A that heats the raw material inside the container 210A to vaporize at least some of the raw material, a raw material discharge pipe 212A that is connected to the container 210A and discharges the raw material, a valve 213A that is provided to the raw material discharge pipe 212A and adjusts the discharge rate of the raw material gas, and a cracking section 214A that breaks down the molecules of the raw material gas to be discharged. As an example, if antimony (Sb) is used as the raw material, by setting the cracking section 214A to be greater than or equal to 1000° C., the raw material to be irradiated is broken down from $Sb_4$ (a tetramer) into $Sb_2$ (a dimer) or Sb (a molecule), and the reactivity and attachment to the substrate 10 change.

The learning processor 3 is described as including one model 35, but may instead include a plurality of models 35. As an example, the learning processor 3 may include a model 35 for each instance of film deposition performed after maintenance, i.e. for each batch. In this case, the learning processing section 34 may perform the learning processing of the model 35 for each batch. Furthermore, the target film characteristic supplying section 37 may supply the target film characteristic data to the model 35 designated by the operator.

The learning processor 3 is described as updating the model 35 through the learning processing, but instead the model 35 obtained through the learning processing may be generated as a model that is separate from the original model 35. In this case, the learning processing section 34 may perform the learning processing of the model 35 designated by the operator. Furthermore, the target film characteristic supplying section 37 may supply the target film characteristic data to the model 35 designated by the operator.

The system 1 is described as including one film deposition apparatus 2, but may instead include a plurality of film deposition apparatuses 2. In this case, the learning processing section 34 may be supplied with learning data acquired from each film deposition apparatus 2 to increase the learning efficiency, or a model 35 obtained by performing the learning processing with learning data obtained from one film deposition apparatus 2 may be shared with the plurality of film deposition apparatuses 2 to increase the production efficiency.

Furthermore, the model 35 is described as outputting the recommended control condition data in response to the input of the target film characteristic data and the state data, but the input data and output data are not limited to this. For example, the model 35 may output film characteristic data of a film to be deposited by the film deposition apparatus 2 made to operate according to control condition data, in response to the input of this control condition data. Furthermore, if the target film characteristics differ from the film characteristics of the film that has actually been deposited, the model 35 may output control condition data indicating the control conditions that could have caused this difference, in response to the input of the target film characteristic data and the actual film characteristic data.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

The computer-readable medium may be a tangible device that can store instructions to be executed by a suitable device, and as a result, a computer-readable medium having instructions stored thereon is a product that includes instructions that can be executed in order to create the means for executing the operations designated by flow charts and block diagrams. Examples of the computer-readable medium may include an electronic storage device, a magnetic storage device, an optical storage device, an electromagnetic storage medium, a magnetic storage medium, an optical storage medium, an electromagnetic storage medium, a semiconductor storage medium, and the like. Specific examples of the computer-readable medium may include a floppy (Registered Trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disk (DVD), a Blu-ray (Registered Trademark) disk, a memory stick, an integrated circuit card, or the like.

The computer-readable instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (Registered Trademark), C++ or the like, and conventional procedural programming languages, such as the "C" programming language or similar programming languages.

The computer-readable instructions may be provided to a processor or programmable circuitry of a general purpose computer, special purpose computer, or other programmable data processing apparatus to produce a machine, either locally, via a local area network (LAN), or via a wide area network (WAN) such as the Internet, and may be executed to create the means for performing the operations designated by the flow charts and block diagrams. Examples of the processor include a computer processor, a processing unit, a microprocessor, a digital signal processor, a controller, a microcontroller, and the like.

Figure 9:
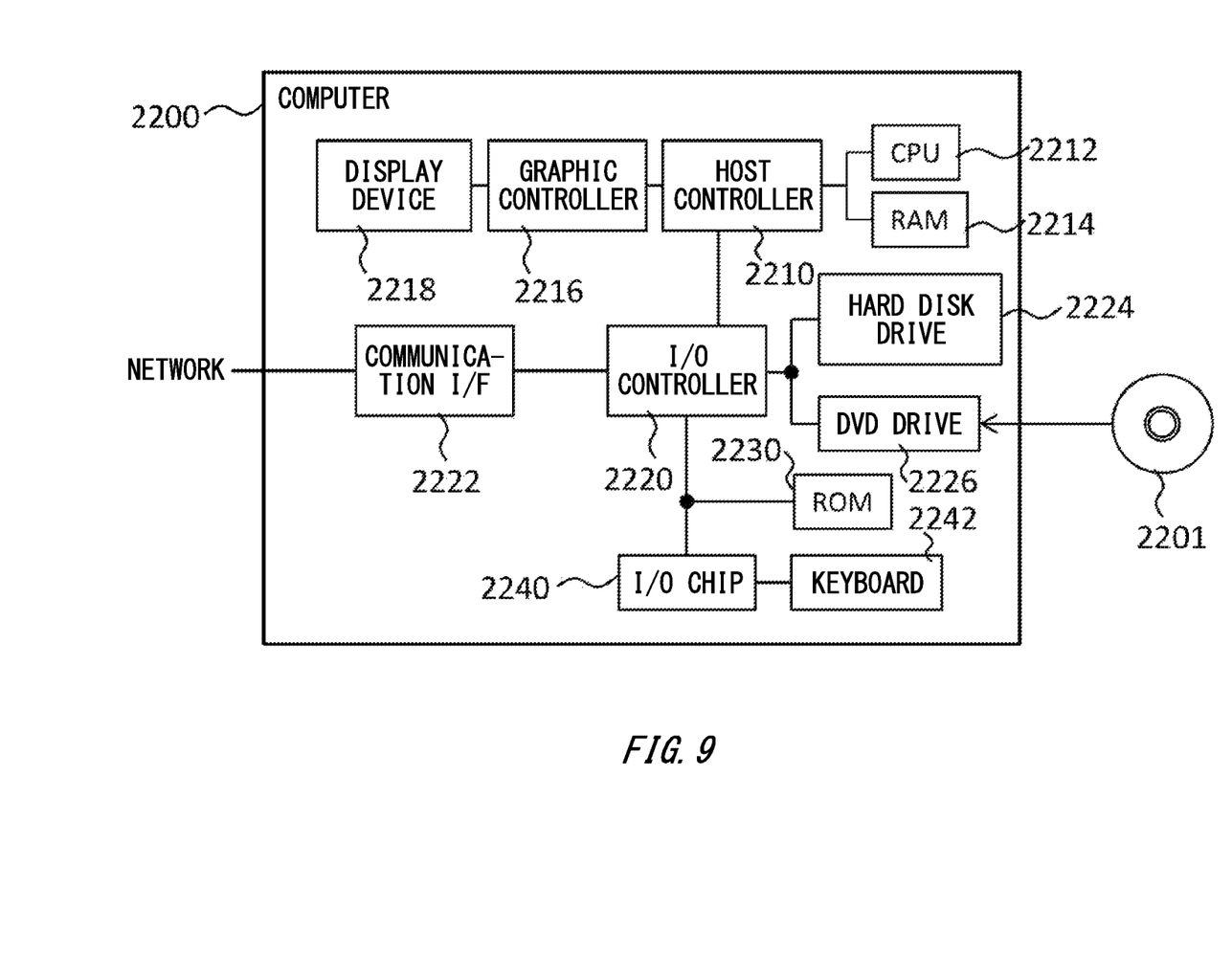
FIG. 9 shows an example of a computer 2200 in which aspects of the present invention may be wholly or partly embodied.

FIG. 9 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

1: system, 2: film deposition apparatus, 3: learning processor, 10: substrate, 20: film deposition chamber, 21: cell, 22: vacuum pump, 23: sub chamber, 24: loading chamber, 31: control condition acquiring section, 32: film characteristic acquiring section, 33: state acquiring section, 34: learning processing section, 35: model, 36: target film characteristic acquiring section, 37: target film characteristic supplying section, 38: recommended control condition acquiring section, 39: control section, 200: substrate manipulator, 201: substrate heater, 202: cryopanel, 210: crucible, 211: heater, 212: shutter, 213: valve, 214: cracking section, 2000: shaft, 2200: computer, 2201: DVD-ROM, 2210: host controller, 2212: CPU, 2214: RAM, 2216: graphic controller, 2218: display device, 2220: input/output controller, 2222: communication interface, 2224: hard disk drive, 2226: DVD-ROM drive, 2230: ROM, 2240: input/output chip, 2242: keyboard

What is claimed is:

1. A learning processor comprising:
   a control condition acquiring section configured to acquire control condition data indicating a control condition of a film deposition apparatus;
   a film characteristic acquiring section configured to acquire film characteristic data indicating a characteristic of a film deposited by the film deposition apparatus that has been caused to operate according to the control condition indicated by the control condition data; and
   a learning processing section configured to perform learning processing of a model that outputs recommended control condition data indicating the control condition of the film deposition apparatus that is recommended in response to input of target film characteristic data indicating a target film characteristic, using learning data that includes the acquired control condition data and film characteristic data.

2. The learning processor according to claim 1, wherein the film deposition apparatus is a molecular beam epitaxy apparatus, and
   the control condition data includes data concerning at least one of a flux amount of raw material to be radiated to a substrate, a temperature of a cell of the molecular beam epitaxy apparatus, power supplied to a heater of the cell, an opening/closing condition of a shutter of the cell, a temperature of the substrate, power supplied to a substrate heater, vacuum degree of a chamber, type of gas present inside the chamber, amount of the gas, a temperature of a cryopanel inside the chamber, an amount of liquid nitrogen supplied to the cryopanel, time needed for film deposition, and gain in feedback control of the temperature of the cell.

3. The learning processor according to claim 1, further comprising:
a state acquiring section configured to acquire state data indicating a state of the film deposition apparatus, wherein
the learning processing section performs the learning processing of the model that outputs the recommended control condition data in response to the input of the target film characteristic data and the state data, using the learning data that further includes the acquired state data.

4. The learning processor according to claim 3, wherein the state data includes operating history data indicating an operating history of the film deposition apparatus.

5. The learning processor according to claim 4, wherein the operating history data includes at least one of data concerning at least one of the number of times maintenance of the film deposition apparatus has been performed and content of the maintenance, data concerning the number of times that at least one component of the film deposition apparatus has been used, data concerning the number of times the film deposition apparatus has performed film deposition, and data concerning a film formed in the past.

6. The learning processor according to claim 1, wherein the film characteristic data includes data concerning at least one of film thickness, composition, flatness, an electrical characteristic, an optical characteristic, crystallinity, surface information, and dislocation density of the deposited film, and
the surface information includes information obtained from an optical micrograph of the deposited film.

7. The learning processor according to claim 1, wherein the film deposition apparatus deposits the film including at least one of Al, Ga, In, As, Sb, Si, Te, Sn, Zn, and Be.

8. The learning processor according to claim 1, further comprising:
a target film characteristic acquiring section configured to acquire the target film characteristic data indicating the target film characteristic;
a target film characteristic supplying section configured to supply the target film characteristic data to the model;
a recommended control condition acquiring section configured to acquire the recommended control condition data output by the model in response to the target film characteristic data being supplied to the model; and
a control section configured to cause the film deposition apparatus to operate according to the control condition indicated by the recommended control condition data.

9. A learning processing method comprising:
acquiring control condition data indicating a control condition of a film deposition apparatus;
acquiring film characteristic data indicating a characteristic of a film deposited by the film deposition apparatus that has been caused to operate according to the control condition indicated by the control condition data; and
performing learning processing of a model that outputs recommended control condition data indicating the control condition of the film deposition apparatus that is recommended in response to input of target film characteristic data indicating a target film characteristic, using learning data that includes the acquired control condition data and film characteristic data.

10. The learning processing method according to claim 9, wherein
the film deposition apparatus is a molecular beam epitaxy apparatus, and
the control condition data includes data concerning at least one of a flux amount of raw material to be radiated to a substrate, a temperature of a cell of the molecular beam epitaxy apparatus, power supplied to a heater of the cell, an opening/closing condition of a shutter of the cell, a temperature of the substrate, power supplied to a substrate heater, vacuum degree of a chamber, type of gas present inside the chamber, amount of the gas, a temperature of a cryopanel inside the chamber, an amount of liquid nitrogen supplied to the cryopanel, time needed for film deposition, and gain in feedback control of the temperature of the cell.

11. The learning processing method according to claim 9, further comprising:
acquiring the target film characteristic data indicating the target film characteristic;
supplying the target film characteristic data to the model;
acquiring the recommended control condition data output by the model in response to the target film characteristic data being supplied to the model; and
causing the film deposition apparatus to operate according to the control condition indicated by the recommended control condition data.

12. A compound semiconductor production method comprising:
preparing a substrate; and
stacking a plurality of films to be included in a compound semiconductor on the substrate, wherein
the stacking includes causing the film deposition apparatus to operate using the learning processing method according to claim 11, to deposit at least one of the plurality of films.

13. A non-transitory computer readable storage medium storing thereon a program that, when executed by a computer, causes the computer to perform operations including:
acquiring control condition data indicating a control condition of a film deposition apparatus;
acquiring film characteristic data indicating a characteristic of a film deposited by the film deposition apparatus that has been caused to operate according to the control condition indicated by the control condition data; and
performing learning processing of a model that outputs recommended control condition data indicating the control condition of the film deposition apparatus that is recommended in response to input of target film characteristic data indicating a target film characteristic, using learning data that includes the acquired control condition data and film characteristic data.

* * * * *